US005750986A

United States Patent [19]
Genovese

[11] Patent Number: 5,750,986
[45] Date of Patent: May 12, 1998

[54] MULTIPLE LASER BEAM DIFFERENTIAL INTENSITY AND START OF SCAN SENSING

[75] Inventor: Frank C. Genovese, Fairport, N.Y.

[73] Assignee: Xerox Corporation, Stamford, Conn.

[21] Appl. No.: 786,612

[22] Filed: Jan. 21, 1997

[51] Int. Cl.$^6$ .................................................. H01J 3/14
[52] U.S. Cl. .......................... 250/235; 250/236; 358/494
[58] Field of Search ................................. 250/234–236; 358/482, 483, 493, 494, 496

[56] References Cited

U.S. PATENT DOCUMENTS

| | | | |
|---|---|---|---|
| 4,342,050 | 7/1982 | Traino | 358/256 |
| 5,347,124 | 9/1994 | Narukawa et al. | 250/235 |
| 5,438,354 | 8/1995 | Genovese | 347/256 |
| 5,508,513 | 4/1996 | Genovese | 250/227.26 |
| 5,530,242 | 6/1996 | Genovese | 250/234 |

Primary Examiner—Stephone B. Allen
Attorney, Agent, or Firm—John M. Kelly

[57] ABSTRACT

A technique for achieving both start-of-scan detection and dynamic beam intensity regulation in a multiple laser beam raster output scanner using a single photodetector. The raster output scanner includes a source or sources of a plurality of laser beams, a rotating polygon having at least one reflecting facet for sweeping the laser beams to form a scan line path, and a photodetector for receiving illumination from the multiple laser beams and for converting those beams into beam-dependent electrical currents. The raster output scanner further includes a scan detection circuit for producing a start-of-scan signal from the beam dependent current, and a beam intensity circuit for producing an electrical output signal which depends upon the difference in beam intensity of at least two of the laser beams. Beneficially, the raster output scanner also includes an optical fiber that collects a portion of the light flux in the sweeping laser beams which directs the light flux onto the photodetector.

9 Claims, 5 Drawing Sheets

MULTIPLE LASER BEAM DIFFERENTIAL INTENSITY AND START OF SCAN SENSING

This invention relates to raster output scanners, and more particularly, to a technique for producing both start of scan timing signals and laser beam intensity differential signals using a single light sensing element.

BACKGROUND OF THE INVENTION

Electrophotographic marking is a well known method of copying or printing documents by exposing a substantially uniformly charged photoreceptor to an optical light image of an original document, discharging the photoreceptor to create an electrostatic latent image of the original document on the photoreceptor's surface, selectively adhering toner to the latent image, and transferring the resulting toner pattern from the photoreceptor, either directly to a marking substrate such as a sheet of paper, or indirectly to a marking substrate after an intermediate transfer step. The transferred toner powder image is subsequently fused to the marking substrate using heat and/or pressure to make the image permanent. Finally, the surface of the photoreceptor is cleaned of residual materials and recharged in preparation for the creation of another image.

While several exposure systems have been developed for use in electrophotographic marking, one commonly used system is the raster output scanner (ROS). A raster output scanner is comprised of a laser beam source, a means for modulating the laser beam (which, as in the case of a laser diode, may be the action of turning the source itself on and off) such that the laser beam contains image information, a rotating polygon mirror having one or more reflective surfaces, pre-polygon optics for collimating the laser beam, post-polygon optics for focusing the laser beam into a well-defined spot on the photoreceptor surface and for compensating for a mechanical error known as polygon wobble, and one or more folding mirrors to reduce the overall physical size of the scanner housing. The laser source, modulator, and pre-polygon optics produce a collimated laser beam which is directed to the reflective polygon facets. As the polygon rotates, the reflected beam passes through the post-polygon optics and is redirected by folding mirrors to produce a focused spot that sweeps along the surface of the charged photoreceptor. Since the photoreceptor moves in a direction that is substantially perpendicular to the scan line, the spot sweeps the photoreceptor surface in a raster pattern. By suitably modulating the laser beam in accordance with the position of the spot, a desired latent image can be produced on the photoreceptor.

Some raster output scanners employ more than one laser beam. Multiple laser beam systems are advantageous in that higher overall process speeds can result if the individual laser beams expose the raster scan lines in parallel at a given resolution, or higher resolution can be provided if the individual laser beams expose multiple raster scan lines at the same process speed. Multiple laser beams can be produced by optically splitting one beam into multiple paths and individually modulating each component, or by incorporating multiple independent laser sources. Typically, raster output scanners that employ multiple sources have a parallel path architecture with closely spaced beams. Parallel, closely spaced laser beams are beneficial in that they can be arranged to share common optical components including the same polygon facets, the same post-polygon lens, and the same mirror system. This tends to minimize relative misalignment errors caused by manufacturing differences in the optical components.

To assist the understanding of the present invention, several additional factors should be understood. First, a phenomenon known as scan line jitter exists in electrophotographic printing. Scan line jitter refers to the failure of pixels in successive scan lines of the raster to be precisely aligned with each other. To help reduce scan line jitter it is common to position a photodetector element in the scan line path just ahead of the latent image area in order to establish accurate data clock phasing on successive scans, a technique generally referred to as start-of-scan detection. When a laser beam crosses the photodetector, a fast start-of-scan transition or edge is produced which is used to initialize the pixel clock controlling the phase of the data stream that modulates the laser beam. Second, in high quality multiple laser beam imaging systems it is important that the individual laser beams deliver the same light flux at the photoreceptor so that the resulting latent image is uniformly exposed. Achieving uniform exposure with independent sources is difficult since each device has slightly different characteristics such as lasing threshold and efficiency at the same operating current. Additionally, the behavior at different operating temperatures and the effects of aging on different sources also can be quite different. Therefore the ability to dynamically regulate the effective exposure provided by the individual laser beams can be important.

Most prior art start-of-scan detectors employ differential sensing using split photodetectors located a short distance upstream from the plane of the photoreceptor. Even though the scan line is slightly out of focus at this position, the differential split photodetector configuration preserves timing accuracy by utilizing common mode rejection to compensate for fluctuations in overall beam intensity. However, because of the high response speed required, the differential split photodetector configuration usually incorporates local electronic circuitry components which are located well away from other electronic subsystems. As a consequence, special electrical hardware harnesses, connectors, and special mounting structures for the start-of-scan detector electronics are often required. One alternative that avoids many of these difficulties is the use of low cost plastic light-pipes or multimode fibers to route the light from the vicinity of the photoreceptor to a more desirable location for the associated light detection circuitry. In this arrangement, a detection method that is insensitive to variations in beam intensity is still required. Furthermore, since multimode light-pipes are significantly larger in cross section than a typical spot in the image plane (as much as 500–700 microns verses 43 microns or smaller), the light is substantially diffused by the time any flux reaches the light sensor.

While the production of a start-of-scan signal and the regulation of the intensities of multiple laser beams can be carried out independently, with separate photodetectors and separate preamplifiers for each, this substantially increases costs and manufacturing and assembly overhead while reducing overall system reliability. Therefore, a technique for achieving start-of-scan detection and dynamic beam intensity regulation of multiple laser beam systems using a single photodetector element would be beneficial. Furthermore, such a technique that can be used with an optical fiber would be even more beneficial.

SUMMARY OF THE INVENTION

The principles of the present invention provide for start-of-scan detection and dynamic beam intensity regulation of multiple laser beams using a single photodetector system. A raster output scanner according to the principles of the present invention includes a plurality of laser sources for generating a plurality of laser beams, a rotating polygon having one or more reflecting mirror facet for sweeping the laser beams along a scanning path, and a photodetector for receiving light flux from the multiple laser beams and for converting the flux into beam-dependent electrical currents. The raster output scanner further comprises a scan detection circuit for producing a start-of-scan signal from the beam dependent current, and a beam intensity circuit for producing an electrical output signal which is a measure of the difference in exposing power of at least two laser beams. Beneficially, a raster output scanner according to the present invention includes an optical fiber with a light receiving end positioned at a predetermined location in the scanning path to collect a portion of the light flux in the sweeping laser beams, and an exit end directing the laser beam flux onto the photodetector.

BRIEF DESCRIPTION OF THE DRAWINGS

In the drawings, like numbers designate like elements. Additionally, the text includes directional signals which are taken relative to the drawings (such as right, left, top, and bottom). Those directional signals are meant to aid the understanding of the present invention, not to limit it.

DETAILED DESCRIPTION OF PREFERRED EMBODIMENTS

Figure 1:
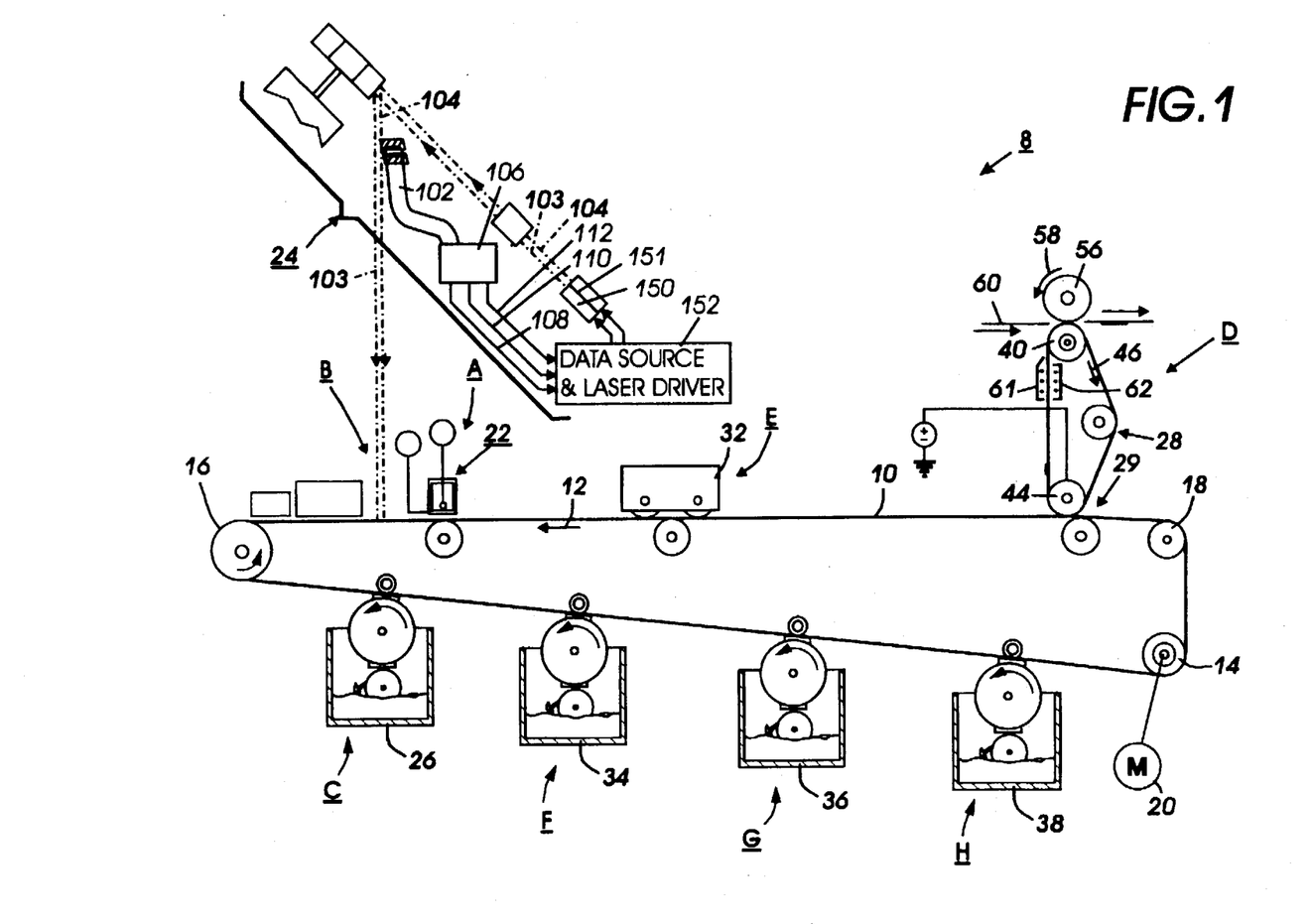
FIG. 1 schematically illustrates an electrophotographic printing machine which incorporates the principles of the present invention.

FIG. 1 illustrates an electrophotographic printing machine 8 designed to produce original documents. Although the principles of the present invention are well suited for use in such machines, they are also well suited for use in other devices. Therefore it should be understood that the present invention is not limited to the particular embodiment illustrated in FIG. 1 or to the particular application shown.

The printing machine 8 includes a charge retentive component in the form of an Active Matrix (AMAT) photoreceptor 10 which has a photoconductive surface and which advances in the direction indicated by arrow 12. Photoreceptor 10 is mounted on a drive roller 14 and tension rollers 16 and 18, with the drive roller 14 being turned by a drive motor 20.

As the photoreceptor advances, each part of it passes through the subsequently described processing stations. For convenience, a single section of the photoreceptor, referred to as an image area, is identified. The image area is a part of the photoreceptor that will be processed by the various stations to produce toner layers. While the photoreceptor 10 may have numerous image areas, each is processed in the same way. Therefore, a description of the processing of one image area will suffice to explain the operation of the printing machine 8.

As the photoreceptor 10 advances, the image area passes through a charging station A. At charging station A, a corona generating scorotron 22 charges the image area to a relatively high and substantially uniform potential, for example −500 volts. While the image area is described as being negatively charged, it could be positively charged if the voltage levels and polarities of the other relevant sections of the printing machine are appropriately reconfigured. It is to be understood that the scorotron 22, as well as the other components mentioned herein, is supplied with electrical power as required for proper operation.

Figure 2:
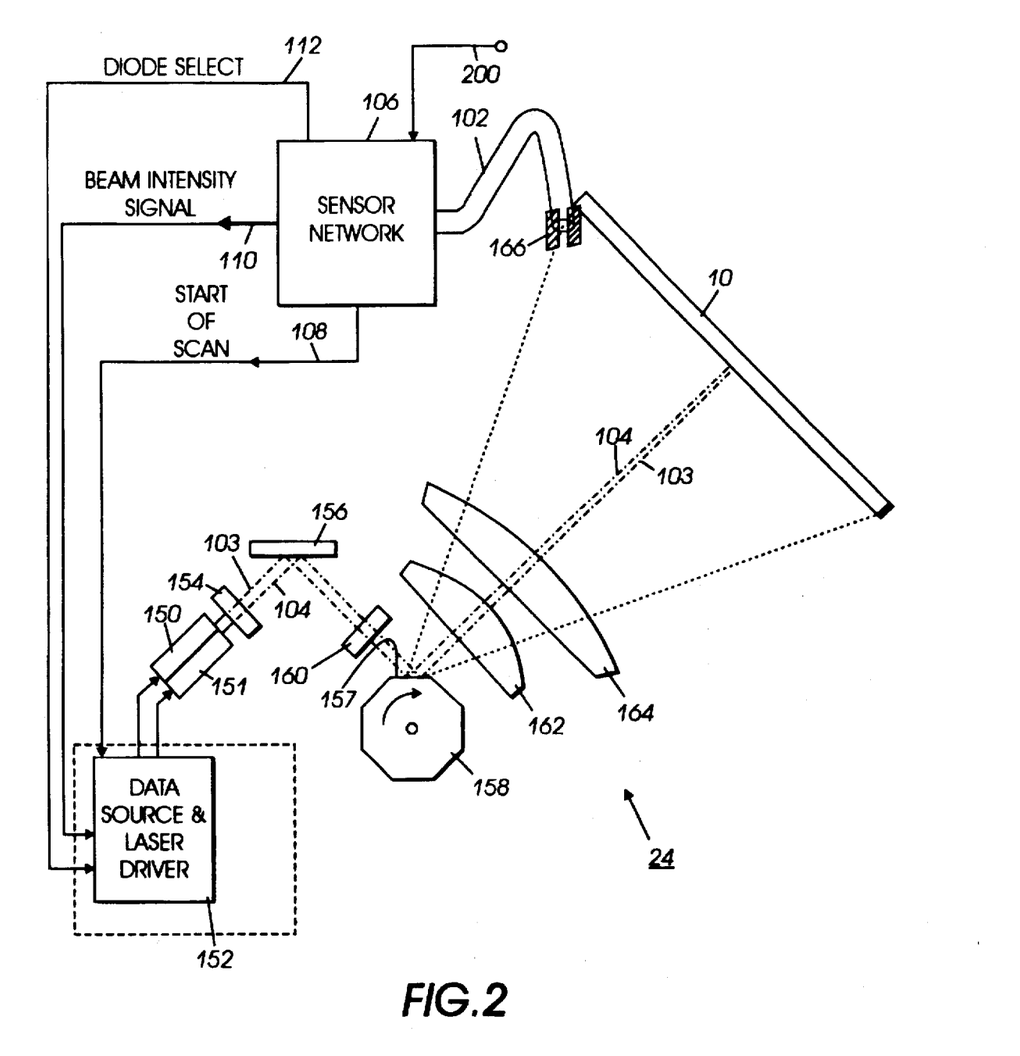
FIG. 2 is a top view of the raster output scanner used in the electrophotographic printing machine illustrated in FIG. 1.

After passing through the charging station A, the photoreceptor advances to an exposure station B. At exposure station B the charged image area is exposed by a dual laser diode raster output scanning assembly 24 that raster scans the image area with multiple (two) laser beams to form an electrostatic latent image of a first color, say black. Laser diodes 150 and 151 in FIGS. 1 and 2, are individually modulated to create beams 103 and 104 that expose separate and distinct scan lines in the raster. While various aspects of the raster output scanning assembly 24 are described in more detail subsequently, it should be understood that the raster output scanning assembly includes an optical fiber 102 strategically placed in the path of the laser beams 103 and 104 such that light flux collected by the optical fiber 102 from either source is guided to a sensor network 106. The sensor network 106 generates a start-of-scan signal 108 and a differential beam intensity signal 110 from the detected light flux in a manner that is described subsequently. The sensor network 106 also generates a diode select signal 112. Signals from the sensor network 106 and an image data source control laser driver circuit 152, which provides a timed data stream that represents the desired image in the form of electrical current that excites the laser diodes 150 and 151.

After passing the exposure station B, the exposed image area is transported through a first "discharged area development" station C, where a negatively charged development material 26 comprised of black toner particles is advanced onto the image area. The development material is attracted to the less negative discharged sections of the image area and repelled by the more negative unexposed sections. The result is a first toner layer on the image area corresponding to the first electrostatic latent image. It will be recognized by those skilled in the art that the present invention can be applied in the case of charged area development, and that the development structures illustrated in FIG. 1 and labeled C, F, G, and H, are of a design suitable for advancing toner particles suspended in a liquid solution to the surface of photoreceptor 10. However, it should be understood clearly that the present invention is not limited to the particular embodiment shown.

After passing the first development station C the image area advances to a transfusing module D that includes a positively charged transfusing member 28, which may be a belt as illustrated in FIG. 1, or a drum, forming a first transfer nip 29 with the photoreceptor surface. The first transfer nip is characterized by a first region of compression or pressure between the photoreceptor 10 and the surface of transfusing member 28. The negatively charged toner layer on the photoreceptor is attracted by the positive potential of the transfusing member.

After the first toner image is transferred to the transfusing member 28, the image area passes to a cleaning station E which removes residual development material and other residue from the surface of photoreceptor 10 using one or more cleaning brushes contained in housing 32.

The image area is again advanced through the charge-expose-develop-transfer-clean sequence for a second color of developer material (for example, yellow). Charging station A recharges the image area and exposure station B illuminates the recharged image area with an optical raster representation of a second color of the composite image (yellow) to create a second electrostatic latent image. The image area is then advanced to a second development station F, where negatively charged development material 34 comprised of yellow toner particles is deposited on the image area in a pattern corresponding to the second electrostatic latent image. The image area and adhered toner pattern advances to the transfusing module D where the second color toner is transferred to the transfusing member 28 in superimposed registration with the first toner layer.

The image area is again cleaned by the cleaning station E, and the charge-expose-develop-transfer-clean sequence is repeated for a third color of development material 36 (magenta for example) using development station G, and for a fourth color 38 (cyan) of development material using development station H.

The transfusing member 28 is entrained between a transfuse roller 40 and a transfer roller 44. The transfuse roller is driven at constant velocity by a motor, which is not shown, such that the transfusing member advances in the direction 46 at the same velocity as photoreceptor 10. The spacing between successive image areas is regulated to match the circumference of transfusing member 28 in order to maintain mechanical synchronism and allow the various toner images to be transferred to the transfusing member 28 in proper registration.

Still referring to FIG. 1, the transfusing module D includes a backup roller 56 which rotates in direction 58. The backup roller 56, which is opposite the transfuse roller 40, forms a second nip with the transfusing member 28, and thus forms a transfusing zone. When a substrate 60 such as a sheet of paper passes through the transfusing zone, the composite toner layer on the surface of transfusing member 28 is heated by thermal energy accumulated from a radiant preheater 61 or from a conductive preheater 62, as well as heat conducted directly from the transfuse roller 40. The combination of heat and pressure in the nip fuses the composite toner layer onto the surface of substrate 60 making a permanent color image.

The present invention is most closely associated with the raster output scanning assembly 24. Referring now to FIG. 2, the raster output scanning assembly 24 laser diodes 150 and 151 which produce laser beams 103 and 104, respectively, are modulated according to image data from the data source and laser driver 152 (which may be physically remote from the raster output scanning assembly 24). The image data from the data source and laser driver 152 might originate from an input scanner, a computer, a facsimile machine, a memory device, or any of a number of other image data sources. The purpose of the data source and laser driver is to excite lasers 150 and 151 with modulated drive currents such that the desired electrostatic latent image is interlaced on the photoreceptor in precise registration with uniform exposure. The output flux from laser diodes 150 and 151 are collimated by optical element 154, reflected by fold mirror 156, and focused on reflective facets 157 of rotating polygon 158 by cylindrical lens 160. The facets of rotating polygon 158 deflect the beams which are then focused into well defined spots focused on the surface of photoreceptor 10 (also see FIG. 1) by scan lens elements 162 and 164.

As polygon 158 rotates, the focused spots trace parallel raster scan lines on the surface of photoreceptor 10. An input end 166 of the optical fiber 102 is positioned in the scan path to collect light flux from beams 103 and 104 at the beginning of the scan. The optical fiber 102 transmits the intercepted flux to the sensor network 106. It should be noted that the scan lines defined by the laser beams 103 and 104 are sufficiently close together and the focused spots small enough in comparison with the geometrical size and shape of optical fiber 102, that both are captured at the input end 166.

Figure 3:
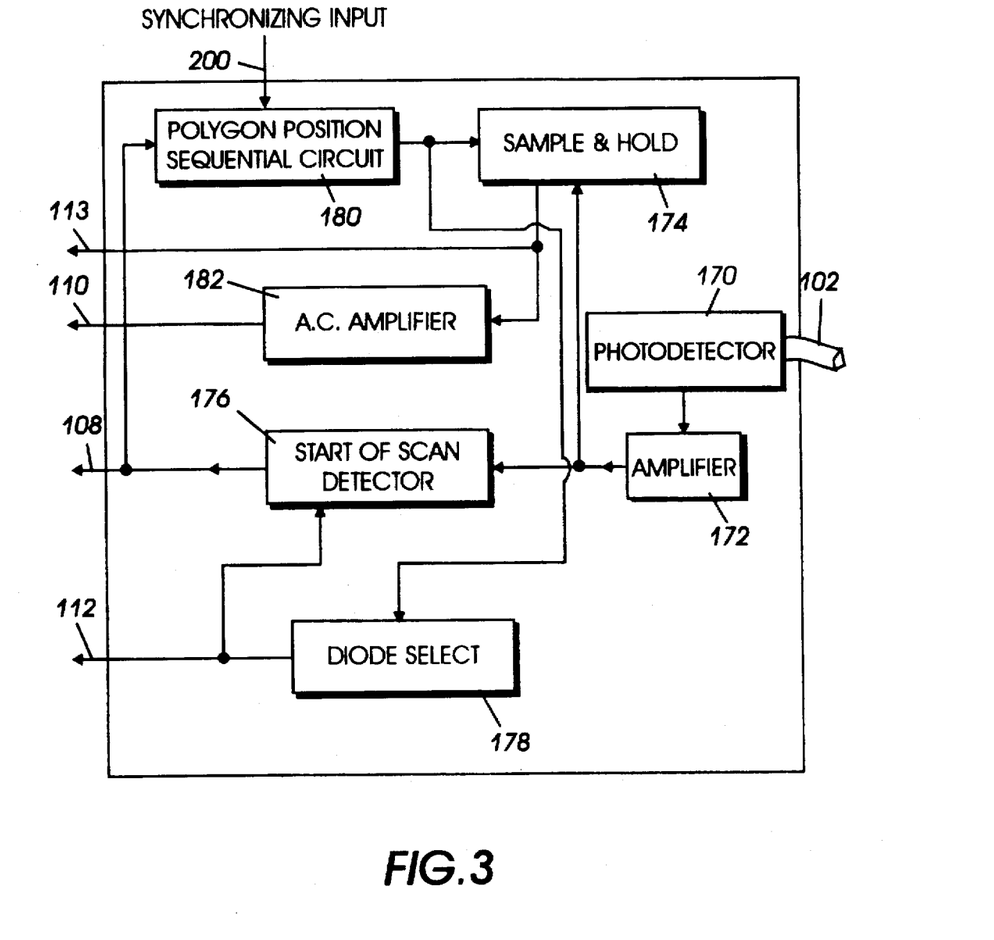
FIG. 3 schematically illustrates a sensor network which produces a start-of-scan signal and a beam intensity control signal for use in the electrophotographic printing machine of FIG. 1.

FIG. 3 illustrates, in a block diagram form, the functional elements of sensor network 106. It is to be understood that the light flux emerging from the output end of optical fiber 102 is directed onto a fast photodetector 170. The photodetector converts the incident photon flux into photocurrent that is amplified and buffered by an amplifier 172. The amplifier output is applied to a sample-and-hold circuit 174 and to a start-of-scan detector circuit 176. The sensor network 106 is further comprised of a diode select network 178, a polygon position sequential circuit 180, and an AC amplifier 182.

It is noted at this time that, depending upon various design factors, the principles of the present invention can be implemented in many ways. It will be assumed in what immediately follows that the laser beams are sized and aligned and the geometry of the input end 166 of optical fiber 102 has be shaped so that there is no start-of-scan timing differential. That is, either laser beam could be used to generate the start-of-scan signal without measurable scan line displacement. It will further be assumed that the number of polygon facets are known, that a synchronizing signal in the form of a once-around pulse or transition synchronized with the rotation of the polygon is derived by the polygon position sequential circuit, and that the approximate delay times between successive scans intersecting with the input end 166 are known. With these assumptions, at an appropriate time in the scan sequence diode select network 178 enables one of the laser beams, for example laser beam 103, in order to provide the optical flux needed for generating a start-of-scan signal. The diode select network supplies a diode select level on line 112 that causes laser driver circuit 152 to excite laser diode 150 but not laser diode 151. When the resulting flux of laser beam 103 is captured by the input end 166 of optical fiber 102, the photodetector 170 produces a photocurrent response that is amplified and buffered by the amplifier 172. The sample and hold circuit 174 is configured to temporarily store the peak voltage amplitude of amplifier 172 with minimum droop until it is updated by the next cycle of the polygon position sequential circuit 180. Small cyclic shifts in the output voltage of sample and hold circuit 174 are amplified by AC amplifier 182.

Figure 4:
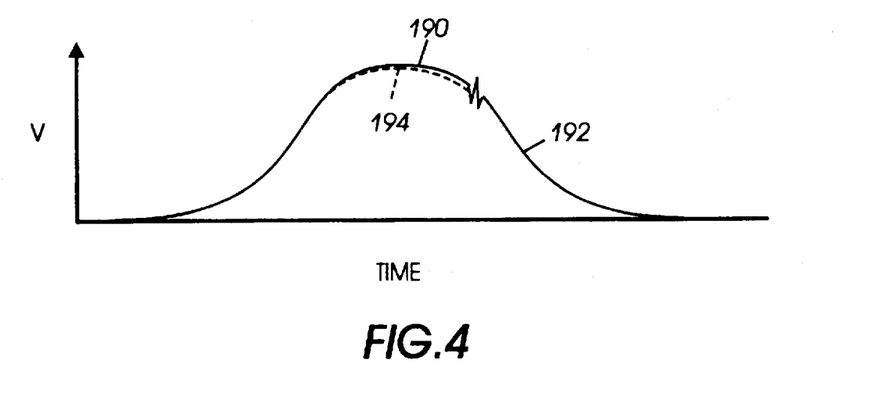
FIG. 4 assists in explaining the operation of the sensor network illustrated in FIG. 3.

During this same time period the start-of-scan detector circuit responds to the output waveform of amplifier 172. Because the input end 166 of optical fiber 102 is relatively large compared with the scanned spots, the output voltage waveform from amplifier 172 plotted with respect to time is rather broad. A representative plot of signals from the amplifier 172 is shown in FIG. 4. Turning now to FIG. 4, it will be assumed that the voltage profile of trace 190 shown as a solid line represents the signal output of amplifier 172 in response to laser beam 103, and the profile indicated by trace 194 shown as a broken line is the response to laser beam 104. The preferred condition for generating a start of scan signal is when the trailing edge of the voltage waveform crosses a threshold reference voltage or trip point 192.

In the preferred arrangement, in order to minimize the timing uncertainty the reference voltage is chosen to coincide with the steepest portion of the trailing edge of the voltage waveform shown in FIG. 4. Those experienced in the art will recognize that several factors affect the choice of the reference voltage. First, the slope of the leading and trailing portions of the voltage waveform are significantly affected by the relative position of the input end 166 of optical fiber 102 with respect to the raster imaging plane. In typical ROS imaging systems as mentioned earlier, most prior art start-of-scan detectors employ differential sensing using split photodetectors located a short distance upstream from the plane of the photoreceptor even though the scan line is slightly out of focus at this position. Thus if the input end 166 of optical fiber 102 is positioned in place of the split detector, the out-of-focus condition reduces the slope of both the leading and trailing edges of the voltage waveforms depicted schematically in FIG. 4, and therefore, like the prior art methods, the timing uncertainty is increased when the sensing aperture is outside the normal depth of focus limits of the scanner.

Figure 7:
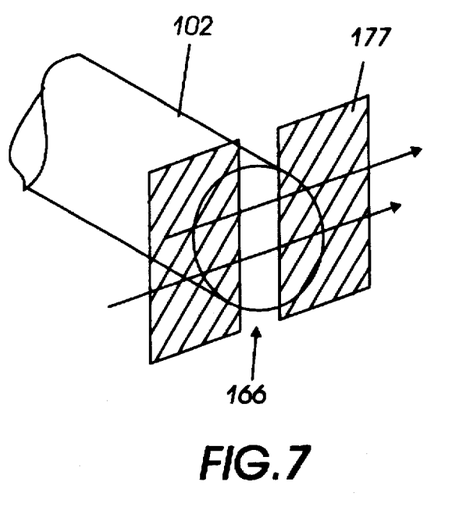
FIG. 7 illustrates a method of providing well-defined rectilinear boundaries for the input end of an optical fiber.
Figure 8:
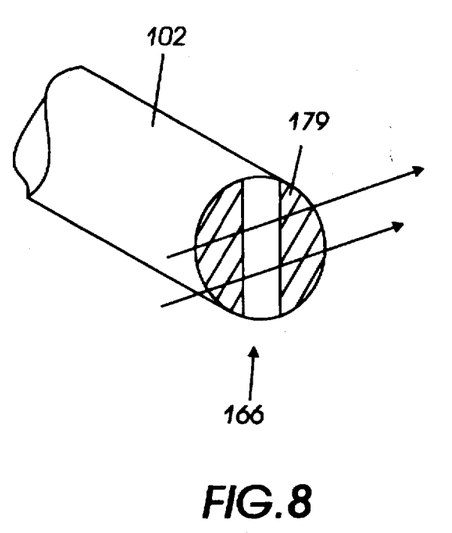
FIG. 8 illustrates an alternative method of providing well-defined rectilinear boundaries for the input end of an optical fiber.

It will be appreciated that in the case of a high quality scanning system where the focused spot can be described as having a symmetric Gaussian profile, the leading and trailing edges of the voltage vs. time waveforms in FIG. 4 are ideally described as having Gaussian first derivatives where the steepest slope coincides with the 50% level of the waveform. This is not necessarily the case when the spot is distorted by intrinsic wavefront errors or contains complex internal structure due to optical interference. It will be further appreciated that the precision of the present invention is reduced when an irregular portion of an input beam is occluded or the beams are differentially occluded, or when the input end 166 of optical fiber 102 does not present a sharp, preferably rectilinear boundary to incident light flux due to excessive contamination or physical damage. FIGS. 7 and 8 illustrate methods of providing well-defined rectilinear boundaries for the input end 166 of an optical fiber 102. In FIG. 7, external opaque light stops 177 create well-defined rectilinear boundaries, while in FIG. 8 the optical fiber itself is provided with opaque regions 179 to create well-defined rectilinear boundaries. For examples of additional methods for shaping fiber ends to reduce alignment sensitivity and present rectilinear boundaries to the scanning beams, reference is made to U.S. Pat. No. 4,952, 022 which is assigned to the assignee hereof and incorporated herein for reference.

Assuming negligible light flux is lost in the fiber and the photodetector element responds rapidly in proportion to the captured flux, the steepest portion of the leading and trailing edges will occur at the nominal 50% level of the waveform. Ideally, the input end 166 of optical fiber 102 is positioned within the nominal depth-of-focus of the scanning system and the light collection aperture is sufficiently wide that the rising and falling edges of the waveform illustrated in FIG. 4 represent the time period of approximately one pixel, and the top of the waveform is relatively flat for a period of from one to ten pixels.

Second, since many factors such as ambient temperature, differential aging rates, facet damage, and contamination of optical surfaces, contribute to changes in the mean optical power of the laser beams, there are also dynamic changes associated with duty cycle heating and other interactions which can be appreciable. Thus in order to minimize the start-of-scan timing uncertainty for similar voltage waveforms of uncertain amplitude, the reference voltage should dynamically adjust in proportion to the actual amplitude of each successive waveform. The split detector schemes of prior art can be interpreted as a version of this approach where the first channel is used to establish a dynamic reference level for the second channel, thereby minimizing timing uncertainty due to fluctuations in the incident beam power.

In the preferred embodiment, the reference voltage for each scan cycle is derived from the amplitude of the waveform by a passive network that establishes the desired reference as a proportion of the waveform peak amplitude that is sequentially captured, for example, by means of a resettable pulse-stretching circuit, or by a separate sample and hold circuit. Ideally the reference value would be proportioned to be 50% of the peak value, but it will be understood that provisions must normally be made to compensate for various circuit voltage offsets and biases. Turning back to FIG. 3, when the start of-scan condition is reached and the trailing edge of the voltage waveform equals the threshold reference value, the start of scan detector generates a fast start-of-scan logic transition on the line 108. That transition is also delivered to the polygon position sequential circuit 180. One function of the polygon position sequential circuit 180 is to identify the specific polygon facet in use during a given scan. For example, if the polygon has 8 facets as shown in FIG. 2, and if facet number one has been selected as the standard facet for intensity measurements, the polygon position sequential circuit 180 tracks the facet sequence and enables the logic that controls the diode select network and initiates the sample and hold sequence that captures the associated output waveform peaks delivered by amplifier 172.

In response to the output of polygon position sequential circuit 180, the diode select network toggles the select command on line 112, which causes laser driver circuit 152 to excite laser diode 151 but not laser diode 150. Thus, the next response from amplifier 172 will be caused by flux from laser beam 104 reflected from standard facet number one. The sample and hold circuit then samples and stores the peak response caused by laser beam 104. As a consequence, the output of the sample and hold circuit continuously toggles between the peak voltage responses to beam 103 and 104 reflected by the same polygon mirror facet.

Figure 5:
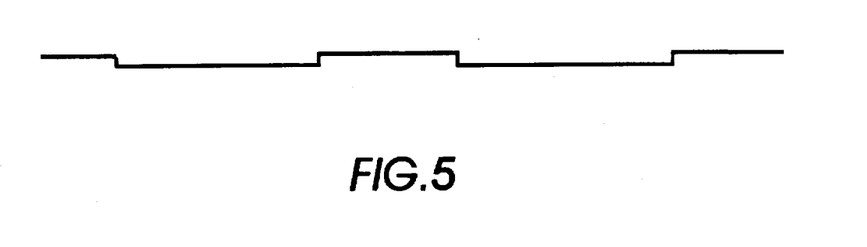
FIG. 5 illustrates the beam intensity signal from the sensor network of FIG. 3.

Turning once more to FIG. 4, traces 190 and 194 represent the waveforms associated with laser beams 103 and 104. As illustrated in FIG. 5, since the peak of trace 194 is slightly less than the peak of trace 190, the input to the AC amplifier 182 is a low level square wave with a period twice the rotational period of the polygon and phase and amplitude relationships that depend upon the difference in exposure power between laser beams 103 and 104. That square wave is amplified by the AC amplifier 182 and the amplified version is output on line 110. Using well known circuitry the signal on line 110 can be employed to dynamically control one or both of the drive currents exciting laser diodes 150 and 151 such that the AC component of the signal on line 110 is minimized and such that the mean amplitude represented by the average peak voltages is maintained at a predetermined calibrated level line. Beneficially, a direct current signal that represents the intensity of the received light flux is output on line 113. That signal can be used to maintain the flux of the laser diodes at the predetermined calibrated level line. Significantly, since a common facet, photodetector, sample and hold, and AC amplifier are used to produce the square wave, the most important sources of common mode measurement errors are minimized. Those familiar with the electronic art will recognize that the relative responses to multiple beams might also be compared by toggling the sources at a high rate near the waveform peak and noting the phase and amplitude of the response. However, this assumes tight tangential alignment of the beams that may not be possible in some scanner designs. It will also be recognized that once the square wave appearing on line 110 has been minimized through action of the control circuitry, traces 190 and 194 can be used interchangeably to establish the start-of-scan threshold reference voltage.

The foregoing has described an apparatus and method for both sensing the start of scan and beam intensity differences of a plurality of laser beams, given the assumption that the laser beams 103 and 104 are sized and aligned so that there is no relative timing differential, that is, either laser beam could be used to generate the start-of-scan signal without measurable scan line displacement. However, the present invention is not limited by such constraints. For example, if the laser beams are offset such that a scan timing differential exists, one could compensate by shifting the data stream by an appropriate number of whole pixels and include an adjustable hardware timing delay in either data path to null any residual timing offset.

However, if the beams are reasonably well aligned, an alternative solution is to excite both laser diodes for sensing the start-of-scan condition since the threshold reference value with both beams simultaneously excited is roughly equal to the peak value of either beam alone once they have been equalized. Turn now to FIG. 6, which presents a graph of the output waveform of amplifier 172 and which will be helpful in explaining how the principles of the present invention can be used when the laser beams are tangentially offset. When the tangential offset of laser beams 103 and 104 is sufficiently large, the resulting responses of the two beams will be well separated in time so that each can be processed without interference from the other. In this embodiment of the present invention, the laser diode sources are excited and their associated waveform amplitudes are captured on sequential scans. For the laser source having the later response, the waveform amplitude is captured and the start-of-scan transition is generated shortly afterward on the trailing edge of the detected waveform. For the laser source having the earlier response, the waveform amplitude is captured, the laser source is quenched, and the diode associated with the later response is excited. As a consequence, the start-of-scan condition is always generated using a response to the later diode.

Figure 6:
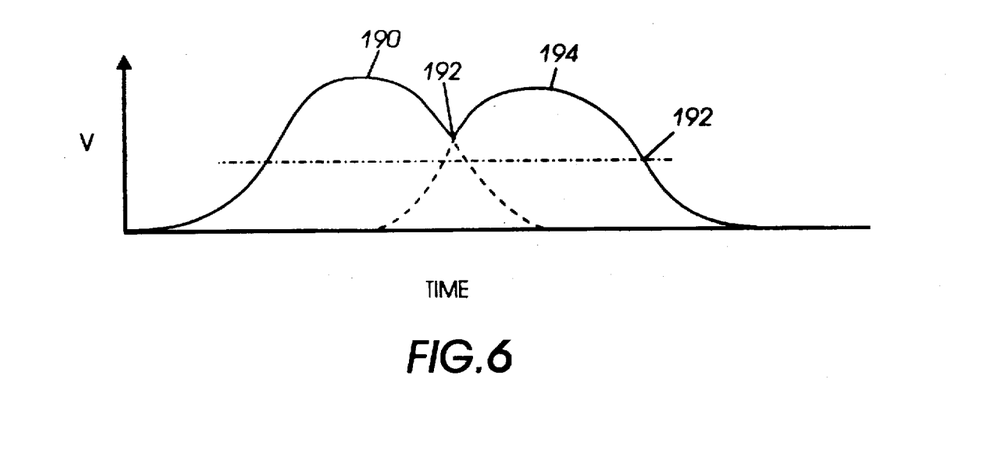
FIG. 6 illustrates the response waveform of a tangentially offset raster scanner system.

When the tangential offset produces partial waveform overlap as shown in FIG. 6 with trace 190 occurring before trace 194, a conventional start-of-scan system might produce a start-of-scan output at either the trailing edge of 194, or in the area of the intermediate minimum 196 between traces 190 and 194. It will be appreciated that the waveform slope at any point near the intermediate minimum is necessarily reduced making this region a poor choice for a timing reference point. In a conventional system, the worst case would be when the reference threshold coincides approximately with the minimum dip 196 between traces 190 and 194, so that the start-of-scan condition toggles arbitrarily between the trailing edge and the intermediate minimum 196.

One embodiment of the present invention avoids these uncertainties by using an optical fiber 102 that provides a waveform response with a broad maximum, and takes advantage of the fast response of the laser diode sources. Since the quenching of the laser source having the earlier response and the excitation of the source having the later response is controlled by the select command on line 112, it is straightforward to disable the output of the start-of-scan detector 176 during the transition from exciting one source to exciting the next, thereby avoiding false responses to temporary waveform instabilities caused by the exchange. For example, response to false start-of-scan conditions can be suppressed from just before initiation of the exchange to one data clock after the exchange. Those practiced in the electronic arts will immediately recognize that this is a well known technique used in state machine design for eliminating logic errors caused by voltage "glitches" and similar disturbances. An example of such a transient is shown on the right hand side of the waveforms illustrated in FIG. 4 where trace 190 transitions to the trailing edge 192 of trace 194. The broad waveform provides ample time to capture the peak value and switch from exciting one device to the next on alternate scans while suppressing false responses. The present invention assumes that the laser diodes respond rapidly to changes in excitation, but as those familiar with the art are aware, this is already a laser requirement for imaging in a raster output system. Thus, while simple timing circuitry to enable the start-of-scan circuitry only during a narrow time window might be employed, the preferred method of the present invention eliminates the need for precise timing circuits and provides a more robust solution that can be extended in a straightforward way to multiple beam raster output scanner systems.

It is to be understood that while the figures and the foregoing descriptions illustrate the principles of the present invention, they are exemplary only. Skilled workers in the applicable arts will recognize numerous modifications and adaptations which will remain within the principles of the present invention. Therefore, the present invention is to be limited only by the following claims.

What is claimed is:

1. A raster output scanner, comprising:
    a laser source for generating a first laser beam and a second laser beam;
    a rotating polygon having at least a first facet, said rotating polygon for sweeping said first laser beam and second laser beam along scan paths;
    a photodetector for receiving fluxes from said swept first laser beam and from said swept second laser beam, said photodetector further for converting said fluxes into electrical signals that depend upon the intensity of said fluxes;
    an amplifier for amplifying said electrical signals from said photodetector;
    a scan detection circuit for producing a start-of-scan signal from said amplified electrical signals; and
    a beam intensity difference detecting network for producing a difference signal from said amplified electrical signals, wherein said difference signal represents the difference in intensities of said first laser beam and said second laser beam.

2. The raster output scanner according to claim 1, further including an optical fiber having a light receiving end positioned in the scan paths for intercepting said sweeping first laser beam and said sweeping second laser beam, said optical fiber further having a light exit end positioned to direct light flux onto said photodetector.

3. The raster output scanner according to claim 1, wherein said beam intensity difference detecting network includes:

a diode driver driving said laser source so as to produce said first laser beam during a first time period and so as to produce said laser second beam during a second time period;

a sample and hold circuit operatively connected to said amplifier, said sample and hold circuit for sampling said electrical signals during said first period and for producing a hold signal having a magnitude that represents the intensity of said first laser beam, said sample and hold circuit further for sampling said electrical signals during said second period and for producing a hold signal having a magnitude that represents the intensity of said second laser beam; and an AC amplifier for amplifying hold signals from said sample and hold circuit.

4. The raster output scanner according to claim 3, wherein said first and second time periods alternate.

5. The raster output scanner according to claim 1, wherein said amplifier produces a direct current signal that represents the intensity of the received light flux.

6. A printing machine, comprising:

a first laser diode for producing a first laser beam;

a second laser diode for producing a second laser beam;

a rotating polygon having a plurality of facets, said rotating polygon for sweeping said first laser beam and second laser beam along a scan path;

a photodetector for receiving light fluxes and for converting said light fluxes into electrical signals that depend upon the intensity of said fluxes;

an optical fiber having a light receiving end positioned in the scan path for intercepting said sweeping first laser beam and said sweeping second laser beam, said optical fiber further having a light exit end positioned to direct light flux onto said photodetector.

an amplifier for amplifying said electrical signals from said photodetector;

a scan detection circuit for producing a start-of-scan signal from said amplified electrical signals; and a beam intensity difference detecting network for producing a difference signal from said amplified electrical signals, wherein said difference signal represents the difference in intensities of said first laser beam and said second laser beam.

7. The printing machine according to claim 6, wherein said beam intensity difference detecting network includes:

a diode driver driving said laser source so as to produce said first laser beam during a first time period and so as to produce said laser second beam during a second time period;

a sample and hold circuit operatively connected to said amplifier, said sample and hold circuit for sampling said electrical signals during said first period and for producing a hold signal having a magnitude that represents the intensity of said first laser beam, said sample and hold circuit further for sampling said electrical signals during said second period and for producing a hold signal having a magnitude that represents the intensity of said second laser beam; and an AC amplifier for amplifying hold signals from said sample and hold circuit.

8. The printing machine according to claim 7, wherein said first and second time periods alternate.

9. The raster output scanner according to claim 6, wherein said amplifier produces a direct current signal that represents the intensity of the received light flux.

* * * * *